(12) United States Patent
Wang et al.

(10) Patent No.: US 10,778,544 B2
(45) Date of Patent: Sep. 15, 2020

(54) DYNAMIC ALLOCATION OF PROCESSING QUEUES FOR CONTROL PACKETS IN SOFTWARE DEFINED NETWORKS

(71) Applicant: VMware, Inc., Palo Alto, CA (US)

(72) Inventors: Yong Wang, Sunnyvale, CA (US); Eduard Serra Miralles, Redwood City, CA (US); David James LeRoy, Los Gatos, CA (US)

(73) Assignee: VMware, Inc., Palo Alto, CA (US)

( * ) Notice: Subject to any disclaimer, the term of this patent is extended or adjusted under 35 U.S.C. 154(b) by 109 days.

(21) Appl. No.: 16/105,420

(22) Filed: Aug. 20, 2018

(65) Prior Publication Data

US 2020/0059421 A1 Feb. 20, 2020

(51) Int. Cl.
*H04L 12/863* (2013.01)
*H04L 12/931* (2013.01)
*H04L 12/26* (2006.01)
*H04L 12/24* (2006.01)

(52) U.S. Cl.
CPC ........ *H04L 43/028* (2013.01); *H04L 41/0677* (2013.01); *H04L 41/20* (2013.01); *H04L 47/50* (2013.01); *H04L 49/70* (2013.01)

(58) Field of Classification Search
CPC ... H04L 43/028; H04L 41/0677; H04L 41/20; H04L 47/50; H04L 49/70
See application file for complete search history.

(56) References Cited

U.S. PATENT DOCUMENTS

2018/0159790 A1* 6/2018 Wang .................. H04L 47/6215

\* cited by examiner

*Primary Examiner* — Melvin C Marcelo

(57) ABSTRACT

Described herein are systems, methods, and software to enhance network traffic management. In one implementation, upon initialization of a computing system, the computing system may select one or more processing queues from a plurality of processing of processing queues to filter control packets of at least one software defined network. The computing system may further configure a network interface to filter the control packets to the identified one or more processing queues.

18 Claims, 9 Drawing Sheets

DYNAMIC ALLOCATION OF PROCESSING QUEUES FOR CONTROL PACKETS IN SOFTWARE DEFINED NETWORKS

BACKGROUND

In computing environments, software defined networks (SDNs) may be used that comprise software modules capable of providing a communication platform for one or more virtual nodes in the computing environment. The software defined networks, which may include virtual switches, routers, distributed firewalls, and the like, may be used to intelligently direct communication on the network by inspecting packets before passing them to other nodes in the network. To provide the required operations, software defined networks may be separated into a data plane, which is used to manage communications for active nodes (virtual machines and containers) in the computing environment, and a control plane, which is used to configure the various virtual switches, routers, distributed firewalls, and the like, as well as identify the operational status of elements within the computing environment.

In some implementations, SDNs use control packets, such as Bidirectional Forwarding Detection (BFD) packets, Border Gateway Protocol (BGP) packets, and other control signaling protocols, which have the requirement of reliable and timely delivery. If, for any reason not related to network failure, the control packets are not delivered within a certain time period, unnecessary actions (such as fail over to a standby node or tear down of a BGP session) will be taken based on the assumption that a network failure has occurred. Using BFD as an example, control packets could be exchanged between transport nodes (hypervisors or gateway nodes, such as Virtual Extensible Local Area Network (VXLAN) tunnel endpoints (VTEPs)), between gateway nodes in a gateway cluster, or between a gateway and a remote router. In a SDN, when control packets are communicated over virtual network interfaces and/or physical network interfaces, the control packets will be mixed with other data packets which are less sensitive to packet drops or delays. Under high load, those control packets can be dropped or significantly delayed by the network interface, which may cause various unnecessary disruptions to the network functions.

Overview

The technology disclosed herein enhances network traffic management for software defined networks. In one implementation, a method of managing network traffic in a computing system includes, in response to an initialization of the computing system, selecting a processing queue for control packets of at least one software defined network from a plurality of processing queues. The method further provides configuring a network interface to filter the control packets to the identified processing queue.

DETAILED DESCRIPTION

Figure 1:
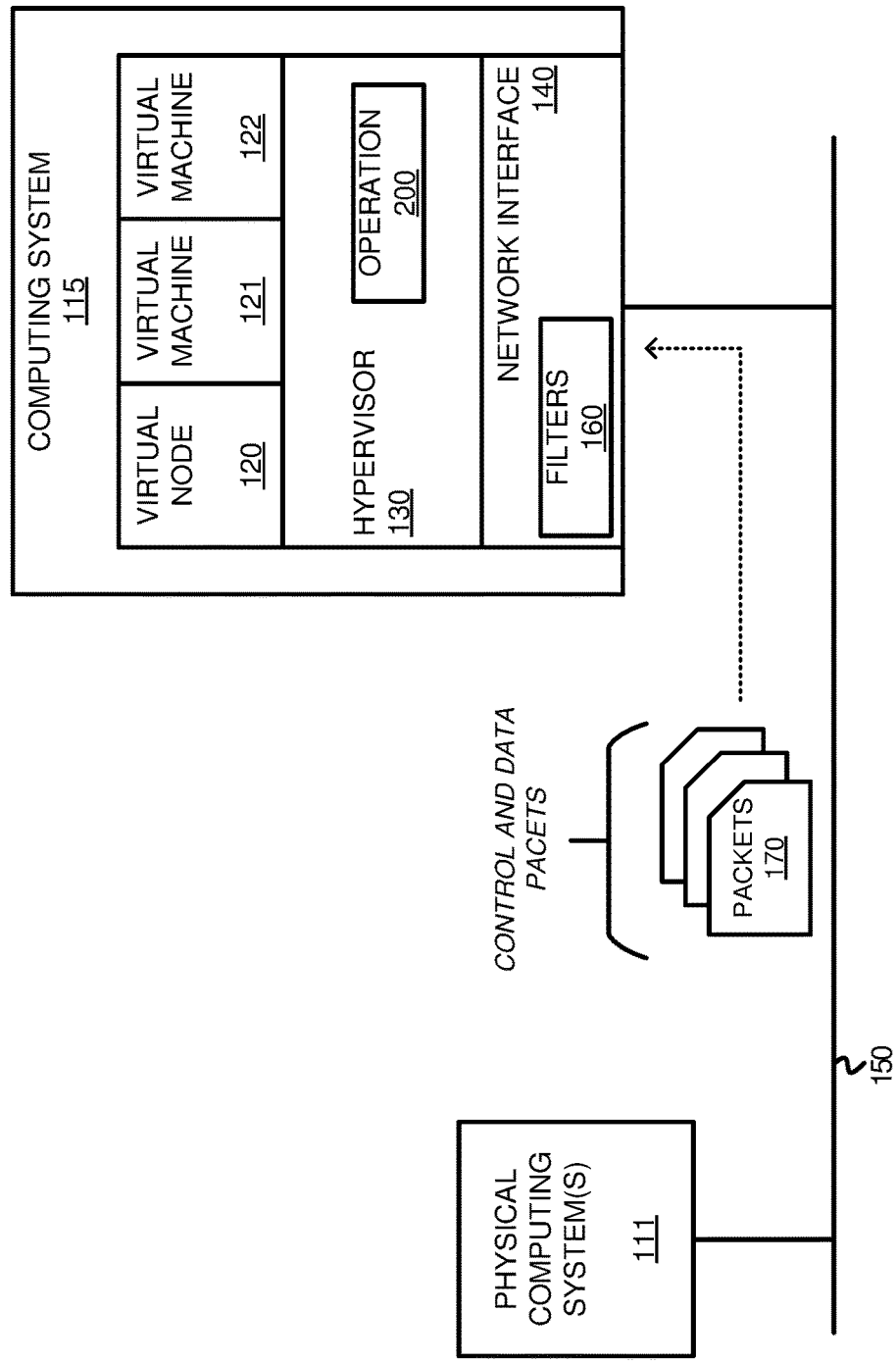
FIG. 1 illustrates a computing environment to prioritize packets for a software defined network according to an implementation.

The various examples disclosed herein provide enhancements for managing control packets as they are received at physical interfaces in a computing environment. In many virtualized computing environments, a plurality of host computing systems may be deployed that provide a platform for virtualized computing nodes, such as virtual machines and containers. To manage the communications between the virtualized computing nodes as well as computing systems outside of the virtual computing environment, software defined networks (SDNs) may be employed that are used to intelligently direct communications by the virtual computing nodes by inspecting packets before forwarding the packets over the network. The operations provided by the SDNs may include virtual switches, routers, distributed firewalls, and the like.

To provide the configurations of the SDNs, a control plane is provided that is used in configuring and maintaining the different virtual networking elements of the computing environment. For example, the control plane may be used to provide configurations of a distributed firewall that is deployed for the virtual computing nodes of the environment to limit the communications of the computing nodes. Additionally, the control plane may be used to verify the operational status of the various virtual networking elements in the computing environment. For example, Bidirectional Forwarding Detection (BFD) packets may be exchanged between virtual switches deployed on multiple hosts to verify the operational status of the virtual switches. If a virtual switch fails to provide a BFD packet within a particular period of time, a failover event may occur, which is used to maintain the operations of the network. This may include moving the operations of the virtual switch to another host computing system, migrating virtual machines, or some other similar failover operation. Although this is one example, in some implementations, in addition to providing the operational status between virtual switches, the BFD packets may further be exchanged between, and used to verify the operational status of, Virtual Extensible Local Area Network (VXLAN) tunnel endpoints (VTEPs) for edge computing nodes, and VTEPs for one or more hypervisors.

Here, to limit delay in the communication of control packets for fault detection, such as BFD and Border Gateway Protocol (BGP) packets, the network interface of the host computing systems may be used to prioritize the packets as they are communicated. In particular, as the packets are received, the network interface may provide packet inspection, using filters and/or offsets, to determine the type of packet that was received, either a data or control packet. Once filtered, the packets may be placed into processing queues based at least one whether the packet is a control packet for a SDN or a data packet traversing the network. These processing queues may each be allocated processing resources, such as processing cores, clock cycles, memory, or any other similar resources, such that that packets in each of the queues receive required resources. As an example, control packets may be allocated at least one queue in a plurality of queues, and when traits are identified for a control packet, the packet may be placed in the at least one queue, while data packets (or packets that are not identified as control packets) may be placed in one or more secondary processing queues in the plurality of queues.

Here, in allocating the processing queues, a process executing on the computing system may be used to dynamically modify which of the queues are allocated to control packets received at the physical network interface. In particular, to limit the disruptions of the control packets from denial of service attacks, large quantities of data packets being allocated to the same processing queue(s) as the control packets, or some other attack or error at the computing system, the process may, via a randomization algorithm, random value generator, and the like, select at least one processing queue in the plurality of processing queues to process the control packets. For example, when a computing system is first initialized (powered on, virtualization platform initialized, and the like), the process may identify one or more initial processing queues for the control packets. Once identified and used to configure the network interface, packets may be filtered by the network interface and placed in the appropriate processing queue. Additionally, in some implementations, the process may identify when an expiration event occurs for the one or more control packet processing queues, and identifies one or more second control processing queues for the control packets. By dynamically modifying the processing queues allocated to the control packets, the process may limit malicious or otherwise interfering packets that are classified into the same queue as the control packets. Additionally, by maintaining the control processing queues, when a large number of packets are received at the computing system during a short interval, the network interface may be configured to prioritize and provide a higher quality of service to the packets classified as control packets.

FIG. 1 illustrates a computing environment 100 to prioritize packets for a software defined network according to an implementation. Computing environment 100 includes physical computing system(s) 111 and computing system 115 with virtual machines 120-122, hypervisor 130, and network interface 140. Computing system 115 further includes operation 200 (further described in FIG. 2) used to configure the filtering operations of network interface 140, and network interface 140 further includes filters 160 that are filter packets as described herein. Although demonstrated as part of hypervisor 130, it should be understood that operation 200 may execute separate from the hypervisor in some implementations. Physical computing system(s) 111 communicate with computing system 115 via communication link 150. Hypervisor 130 may comprise a hosted hypervisor that executes on top of an operating system or may comprise a bare metal hypervisor that executes without the requirement of an operating system to provide a virtualization layer to the virtual machines. Although demonstrated in the example of computing environment 100 as a host with virtual machines executing via a hypervisor, it should be understood that similar operations may be provided by an edge host that provides network connectivity as a distributed router or centralized gateway for services of a software defined network (such as firewall services, virtual private network (VPN) services, and the like), wherein the edge host may be connected to the internet, other edge hosts, as well as hosts for virtual machines and containers. In particular, rather than a hypervisor and virtual machines, the edge host may comprise at least one virtual switch and a VTEP to communicate with the other computing systems.

In operation, computing system 115 executes hypervisor 130 to provide a platform for virtual machines 120-122. Hypervisor 130 abstracts the physical components of computing system 115 and provides virtual representations of hardware to the virtual machines, including processing systems, storage interfaces, network interfaces, or some other abstracted components. In addition to providing the abstracted hardware for the operations of virtual machines 120-122, hypervisor 130 may be used to provide one or more SDNs to the virtual machines. These SDNs are used to provide connectivity between virtual machines and computing nodes that may exist on the same host computing system, or may operate on separate computing systems.

To provide the one or more SDNs, control packets, such as BFD packets, BGP packets, or some other similar control or signaling protocol packets that are sensitive to packet loss or delay, are exchanged between physical host computing systems to provide various operations. The operations may include configuring virtual switches and routers on the host computing systems, providing health monitoring between hypervisors and physical machines, or providing any other similar control operation. Because the control operations often require a timely exchange of communications, when a communication is not received within a defined time period, failover mechanisms may be employed to compensate for the delay in the communication. For example, if a first host fails to receive a control message from a second host within a defined time period, the first host may identify a failure of the second host and initiate failover operations to a third host.

Here, to better identify control messages and manage congestion of packets 170 at physical network interface 140, processes are included to prioritize time sensitive control packets over other data packets received at a network interface. This ensures that the control packets are not delayed in communication due to congestion of other data packets being communicated between hosts or other physical computing systems.

Figure 2:
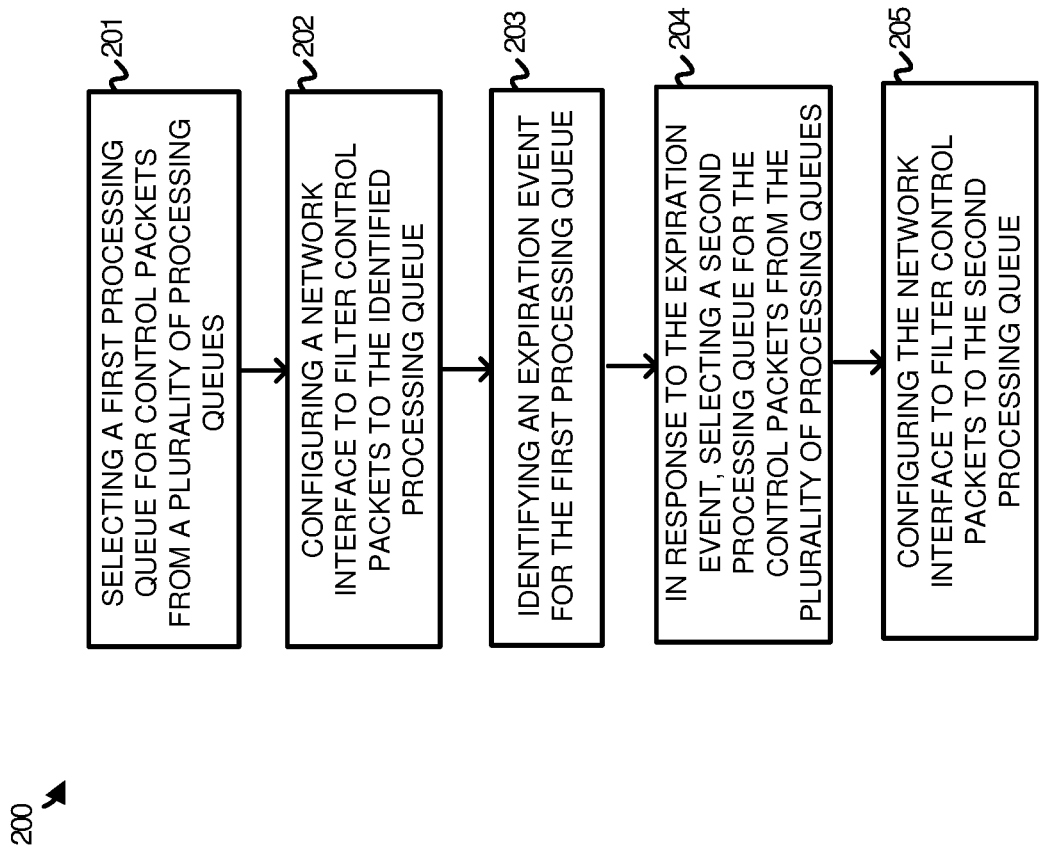
FIG. 2 illustrates an operation of a computing system to prioritize packets in processing queues according to an implementation.

FIG. 2 illustrates an operation 200 of a computing system to prioritize packets in processing queues according to an implementation. The processes of FIG. 2 are referenced parenthetically in the paragraphs that follow with reference to systems and elements from computing environment 100 of FIG. 1.

As depicted, operation 200 on computing system 115 includes selecting (201) a first processing queue for control packets from a plurality of processing queues. In some implementations, network interface 140 on computing system 115 may be capable of packet inspection to identify traits of the packets and allocate the packets to various processing queues for processing by the main processing system of computing system 115. These processing queues may each be allocated clock cycles, processing cores, memory, or some other resource of the main processing system. Here, operation 200 is used to identify control packets, which are often time sensitive for the software defined network (such as fault detection packets), and place the packets in a processing queue to ensure adequate processing resources are available to process the control packets. In some implementations, the selection of the first processing queue from the plurality of processing queues may occur when computing system 115 and hypervisor 130 are initialized. Thus, as a startup mechanism (e.g. power on of computing system 115 or initialization of the virtualization platform), operation 200 executes to select the first processing queue for packets. In selecting the first processing queue, computing system 115 may use an algorithm to provide randomization in selecting the queue, may select the queue via a random value generator of the computing system, or may select the queue in any other similar manner.

Once selected, operation 200 will configure (202) network interface 140 to filter control packets to the identified processing queue. After configuration, packet inspection may be performed, via filters 160 of network interface 140, to identify control packets for at least one software defined network and allocate the packets to the identified processing queue. This packet inspection may be performed via offsets and/or filters for the packets to identify whether the traits of the packet correspond to a control packet. In some implementations, in configuring network interface 140, operation 200 may program the receive side scaling of network interface 140 to prevent other packets, such as data packets, from being allocated to the same processing queue as the control packets. In this manner, operation 200 may be used to separate all packets with control attributes from all other packets received at the same network interface.

Once network interface 140 is configured on computing system 115, operation 200 identifies (203) an expiration event for the first processing queue. This expiration event may occur when a particular amount of time has elapsed for implementing the first processing queue, when a particular number of packets have been processed via the first processing queue, when the processing queue grows to a particular size, or any other similar expiration event. In response to identifying the expiration event, operation 200 selects (204) a second processing queue for the control packets from the plurality of processing queues, and configures (205) the network interface to filter control packets to the second processing queue. In some implementations, in changing the processing queue for the control packets, operation 200 may be used to prevent unknown or malicious packets from preventing the processing of time sensitive control packets. For example, a denial of service attack may provide attributes that permit non-control packets to be placed in the same processing queue as the control packets. By changing the queue that is allocated for the control packets, the computing system may ensure that BFD packets, BGP packets, and the like that are time sensitive to processing will not be interfered with by other packets received at the computing system. In some implementations, operation 200 may implement the same algorithm that was used to identify the first processing queue, however, it should be understood that different algorithms and/or random value generators may be used in selecting the processing queue.

Although demonstrated in the example of operation 200 as allocating a single processing queue to the control packets, it should be understood that operation 200 may allocate any number of processing queues to the control packets. For example, operation 200 may identify all available processing queues for the processing system, and allocate a subset of the available queues to the control packets.

Despite being demonstrated in the examples of FIGS. 1-2 as a host with virtual machines executing via a hypervisor, it should be understood that similar operations may be provided by an edge host that provides network connectivity as a distributed router or centralized gateway for services of a software defined network (such as firewall services, VPN services, load balancing services, and the like), wherein the edge host may be connected to the internet, other edge hosts, as well as hosts for virtual machines and containers. In particular, rather than a hypervisor and virtual machines, the edge host may comprise at least one virtual switch and a VTEP to communicate with the other computing systems to provide data and control communications. In some implementations, the edge gateway functions may be implemented as a virtual machine or container on a host computing system and provide the various functions described above, such as load balancing and failover operations, wherein the virtualized gateway function may communicate with gateway functions on other host computing systems.

While demonstrated in the previous example as selecting a processing queue for control packets, it should be understood that similar operations may be provided to any packets with a quality of service requirement. In particular rather than selecting processing queue for packets associated with a control protocol, the hypervisor may select processing queues for any packets with a quality of service requirement. These packets may comprise packets from a particular source address, packets with particular header flags or metadata, or any other packet capable of identification via attributes at the network interface. The quality of service requirement may include time sensitive packets, packet such as packets that configure or provide various operations to processes executing on the computing system, or any other packet that requires reliable and timely delivery.

FIGS. 3A-3D illustrate an operational scenario of allocating and filtering packets on a computing system according to an implementation. The operational scenario depicted in FIGS. 3A-3D includes computing system 305 with network interface 310 and processing system 320. Processing system 320 is configured to provide configuration operation 350, which is similar to operation 200 described above in FIG. 2. Computing system 305 further includes processing queues 330-332, wherein packets as they are received at network interface 310 are placed or allocated into one of the processing queues.

Figure 3A:
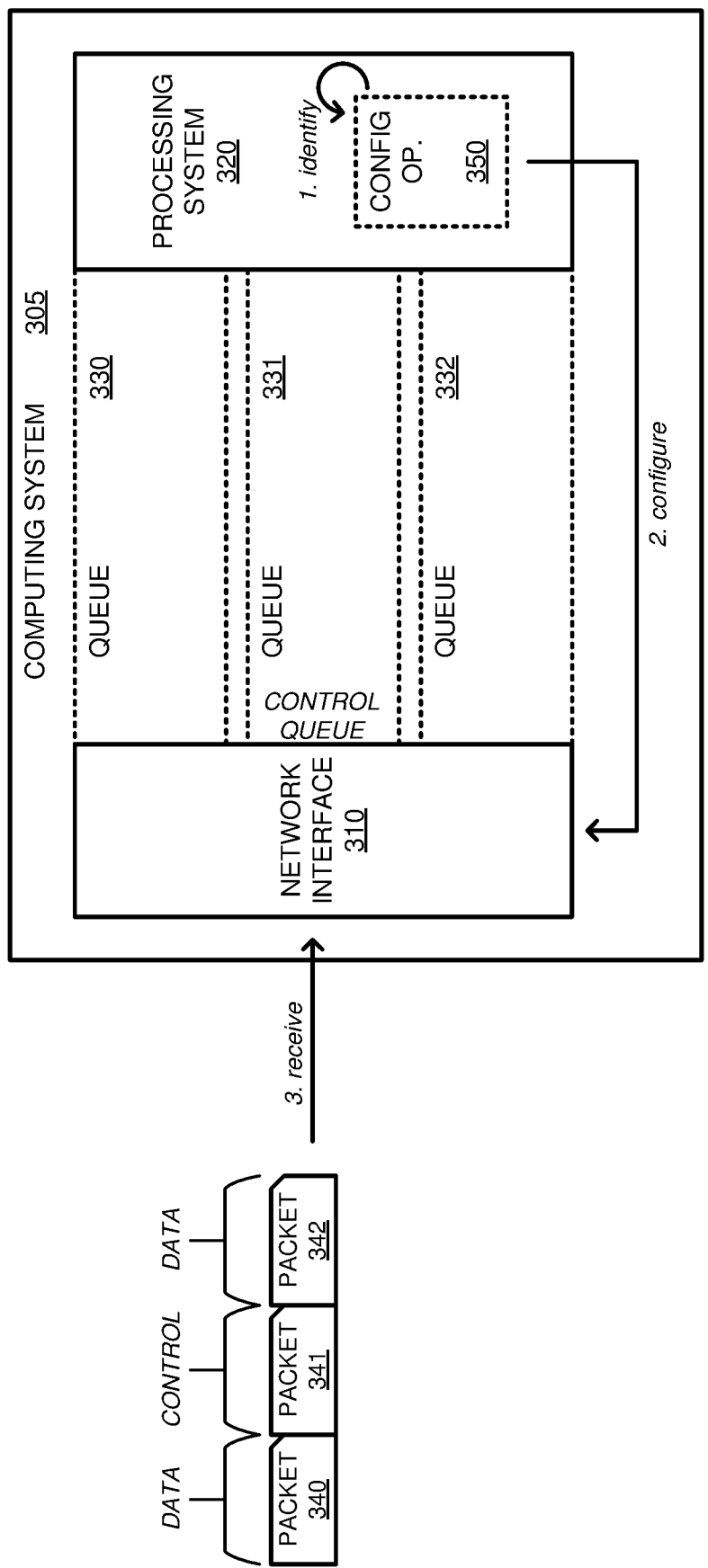
FIGS. 3A-3D illustrate an operational scenario of allocating and filtering packets on a computing system according to an implementation.

Referring first to FIG. 3A, configuration operation 350 identifies, at step 1, at least one processing queue to support the processing of control packets from other computing systems. These control packets may comprise BFD packets, BGP packets, or some other similar packet communicated as part of the control plane of a software defined network. Once the processing queue is identified, processing system 320 may configure, at step 2, network interface 310, such that packets with control packet traits are placed or allocated in the identified at least one processing queue. Here, configuration operation 350 selects processing queue 331 from processing queues 330-332 for processing the control packets. Once network interface 310 is configured, packets 340-342 may be received, at step 3, at network interface 310 and processed according to the configuration provided by configuration operation 350. In some implementations, when network interface 310 is configured, processing system 320 may also program the receive side scaling of the network interface to prevent any packet without control attributes (e.g. control packet addressing, protocol, and the like) from being allocated to the control packet processing queue. Thus, data packets and any other packets that do not qualify as a control packet may be allocated to the other processing queues of the computing system.

Figure 3B:
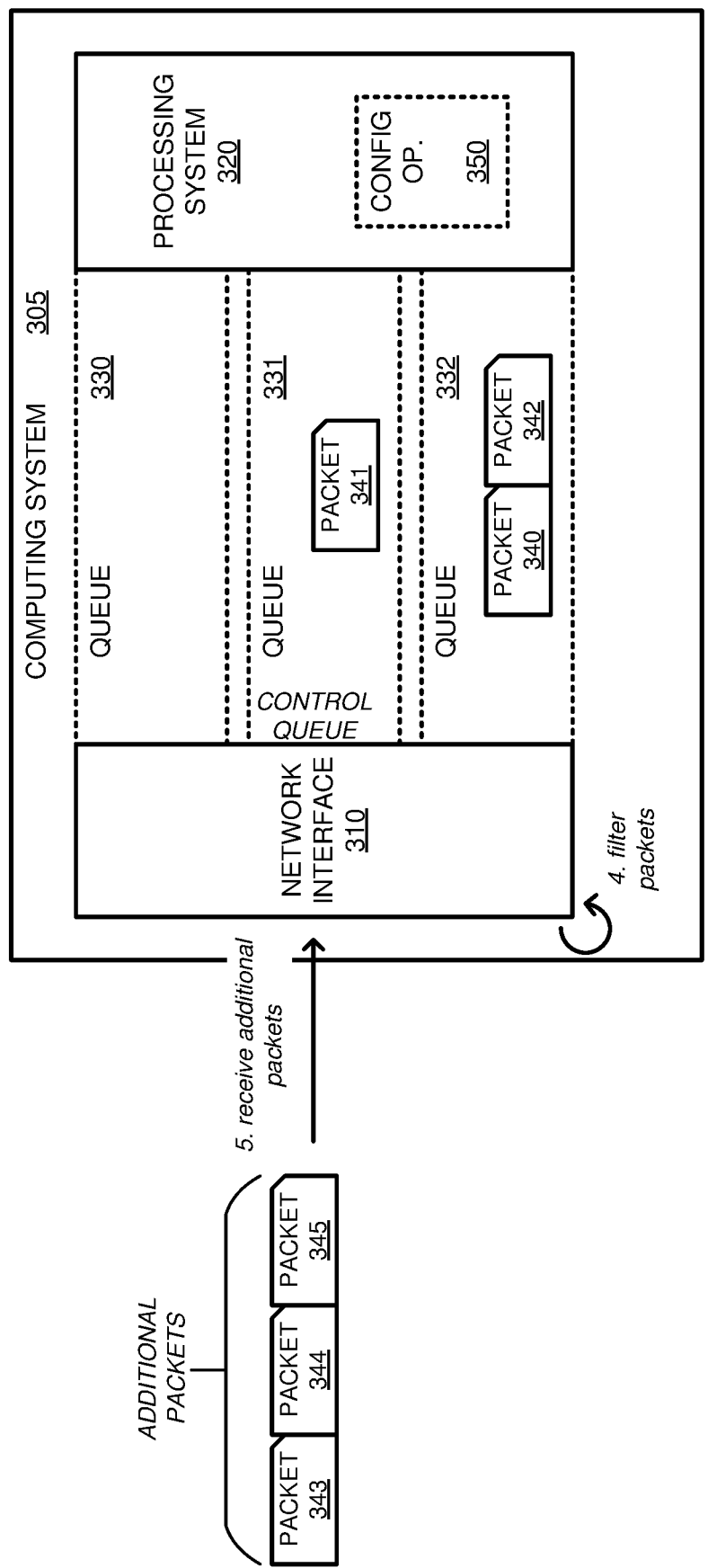

Turning to FIG. 3B, as the packets are received at network interface 310, each of the packets are filtered, at step 4, into a processing queue of processing queues 330-332 based on an inspection of the packets. This inspection may include providing offsets and filters to the packets to identify addressing information, protocol information, metadata information, and other similar information about the packet. Once processed, the packets may be placed in one of processing queues 330-332. In the present implementation, as packets are processed by network interface 310, packet 341 is allocated to queue 331, which is associated with control packets, and packets 340 and 342 are allocated to queue 332, which are available for processing data packets.

In some implementations, in inspecting the packets, network interface 310 may identify internet protocol addressing traits, protocol identifiers, metadata, or some other similar information in the packets to identify whether the packet comprises a control packet. As a result, based on the traits, packet 341 may be allocated to processing queue 331 for processing, while the other packets are provided to another processing queue 332. Once the first packets are allocated and placed in the appropriate processing queue, additional packets may be received at network interface 310, at step 5.

In some examples, the processing queue that is allocated to control packets may exclude packets that are not identified as control packets. In this manner, rather than being processed alongside other data packets on computing system 305, the control packets may be processed from a separate queue ensuring that the packets receive an adequate quality of service and are not slowed in processing during peak traffic times.

Figure 3C:
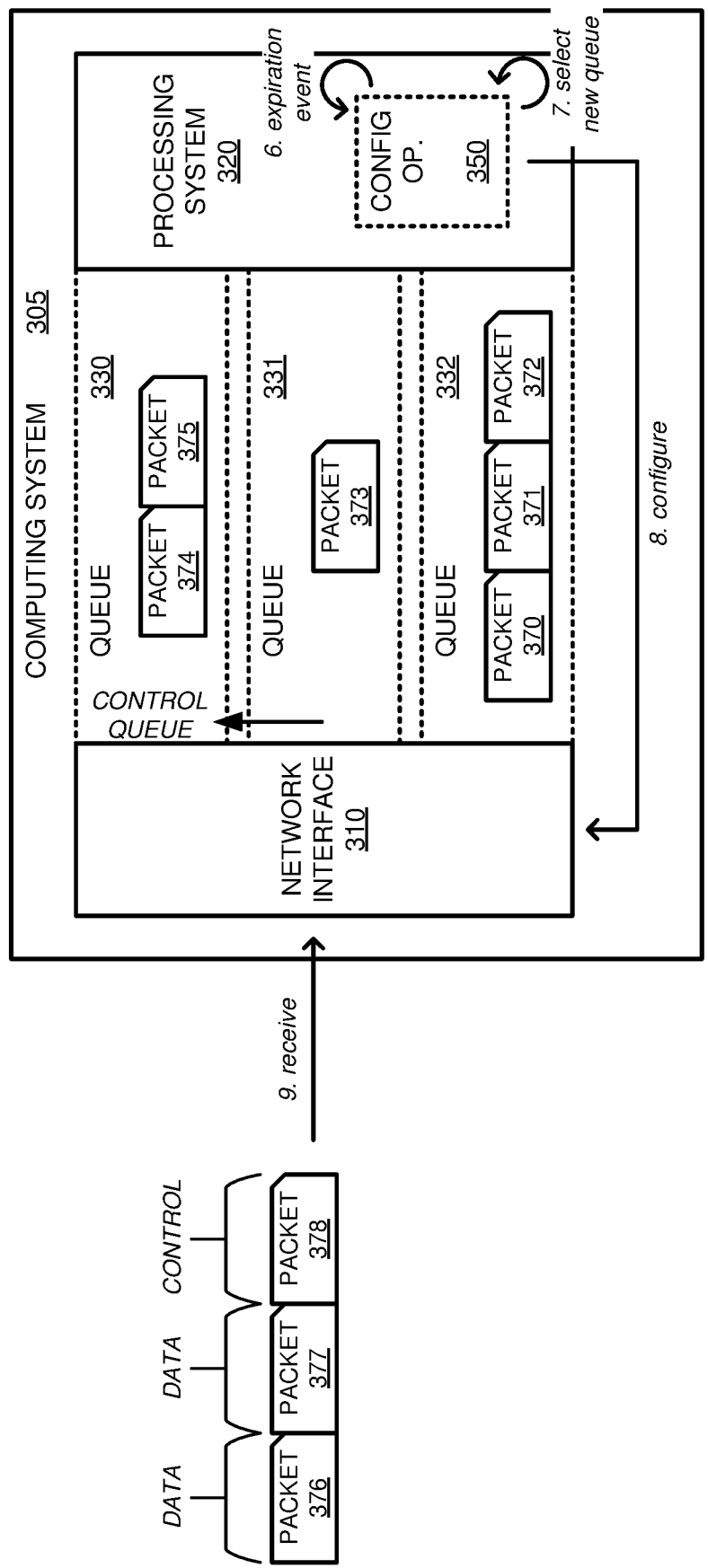

Referring now to FIG. 3C, as the packets are filtered using at least the configuration from configuration operation 350, configuration operation 350 monitors, at step 6, for an expiration event for the processing queue. This expiration event for the processing queue may occur when a threshold quantity of packets is processed out of the queue, when the processing queue has been allocated to the control packets for a threshold time period, when the length of the processing queue reaches a threshold value, of some other similar event. As an example, configuration operation 350 may monitor processing queue 331 to determine when the queue reaches a threshold length of packets, as this may indicate that non-control packets are being allocated or placed in the processing queue. In response to identifying the expiration event for the processing queue, configuration operation 350 selects, at step 7, a second queue for handling the control packets. This selection of the second queue may be accomplished using the same algorithm as for the first processing queue, may be accomplished using a different algorithm, may be accomplished using a random value generator, or may be accomplished using any other similar method for selecting one of the processing queues. In some examples, the operation for selecting the queue may select the processing queue in a random or pseudorandom manner. In other examples, the processing queue may be selected based on the current status of each of the queues, such as selecting the queue that is smallest in length, selecting the queue that has processed the least number of packets, or selecting a queue in any other similar manner based on the current status of the processing queues. Here, configuration operation 350 identifies processing queue 330 to replace processing queue 331 in providing the required functions for control packets.

Once a second processing queue is selected, configuration operation 350 configures, at step 8, network interface 310 to filter packets based on the selection. Here, processing queue 330 contains data packets 374-375, processing queue 331 contains packet 373, and processing queue 332 contains packets 370-372 prior to the configuration operation. Once the configuration operation is implemented, any new packets corresponding to control packets may be placed in the newly identified processing queue. In particular, when packets 376-378 are received at step 9, packet inspection may be performed on the packets to determine whether the packet comprises a control packet, and place any control packets in the newly identified control packet processing queue (in this example processing queue 330).

Figure 3D:
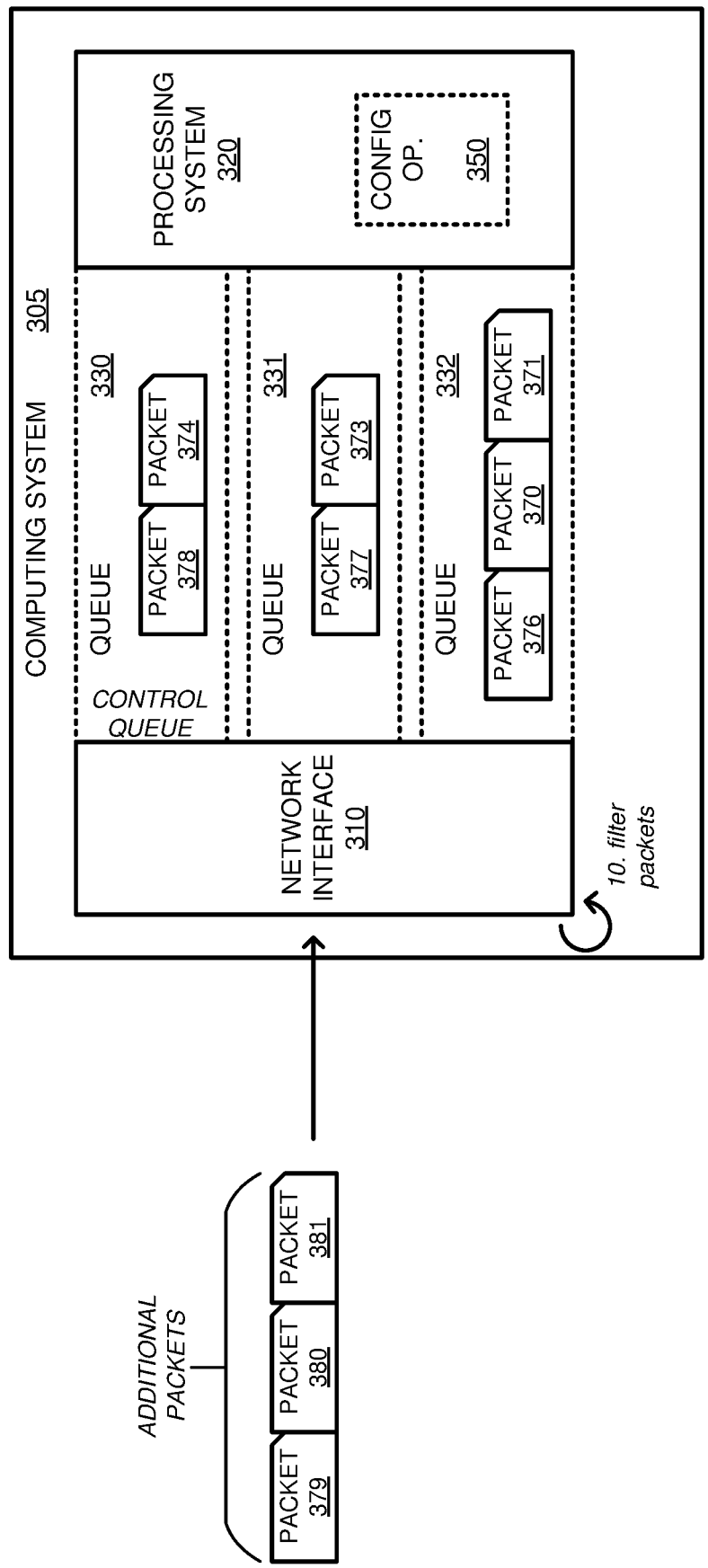

Turning to FIG. 3D, FIG. 3D illustrates the processing of packets under a second configuration by configuration operation 350. As depicted, when packets 376-378 are received, the packets are inspected and filtered, at step 10, into processing queues 330-332. In the particular example of FIG. 3D, because packet 378 comprises a control packet, the packet is allocated or placed in processing queue 330. In contrast, because packets 376-377 include traits of data packets, the packets are placed in one of processing queues 331-332. After filtering packets 376-378, network interface 310 may continue to filter additional packets based on the second configuration from configuration operation 350, so long as the second configuration is active.

In some implementations, once the second configuration is implemented in network interface 310, processing system 320 may monitor the state of the processing queues to determine another expiration event for control packet processing queue. Again, this expiration event may occur when a quantity of packets that have been allocated to the control packet processing queue meet a threshold value, when the quantity of packets processed from the control packet processing queue meet a threshold value, when the length of the control packet processing queue meets a threshold value, when a timeout for the queue occurs, or at some other similar interval. Configuration operation 350 may then repeat the functions described herein to select a new processing queue for the control packets.

Although demonstrated in the example of FIGS. 3A-3D as allocating a single processing queue to the control packets, it should be understood that additional processing queues may be allocated to the control packets. As an example, in computing systems with a large quantity of processing queues, configuration operation 350 may allocate multiple processing queues to the control packets, while remaining processing queues may be used for other data packets to be processed by the computing system.

Figure 4A:
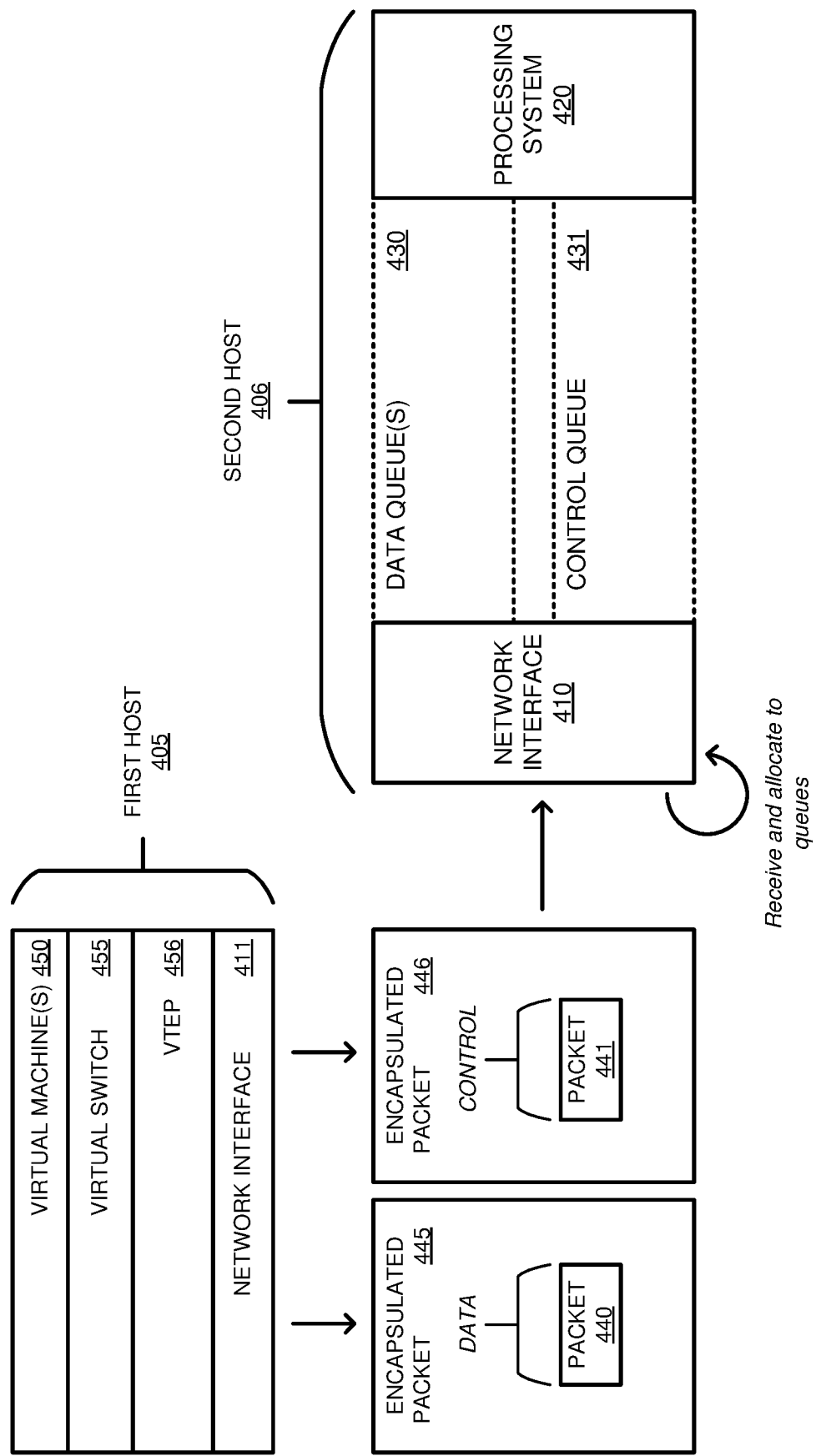
FIGS. 4A-4B illustrate an operational scenario of filtering encapsulated control packets according to an implementation.
Figure 4B:
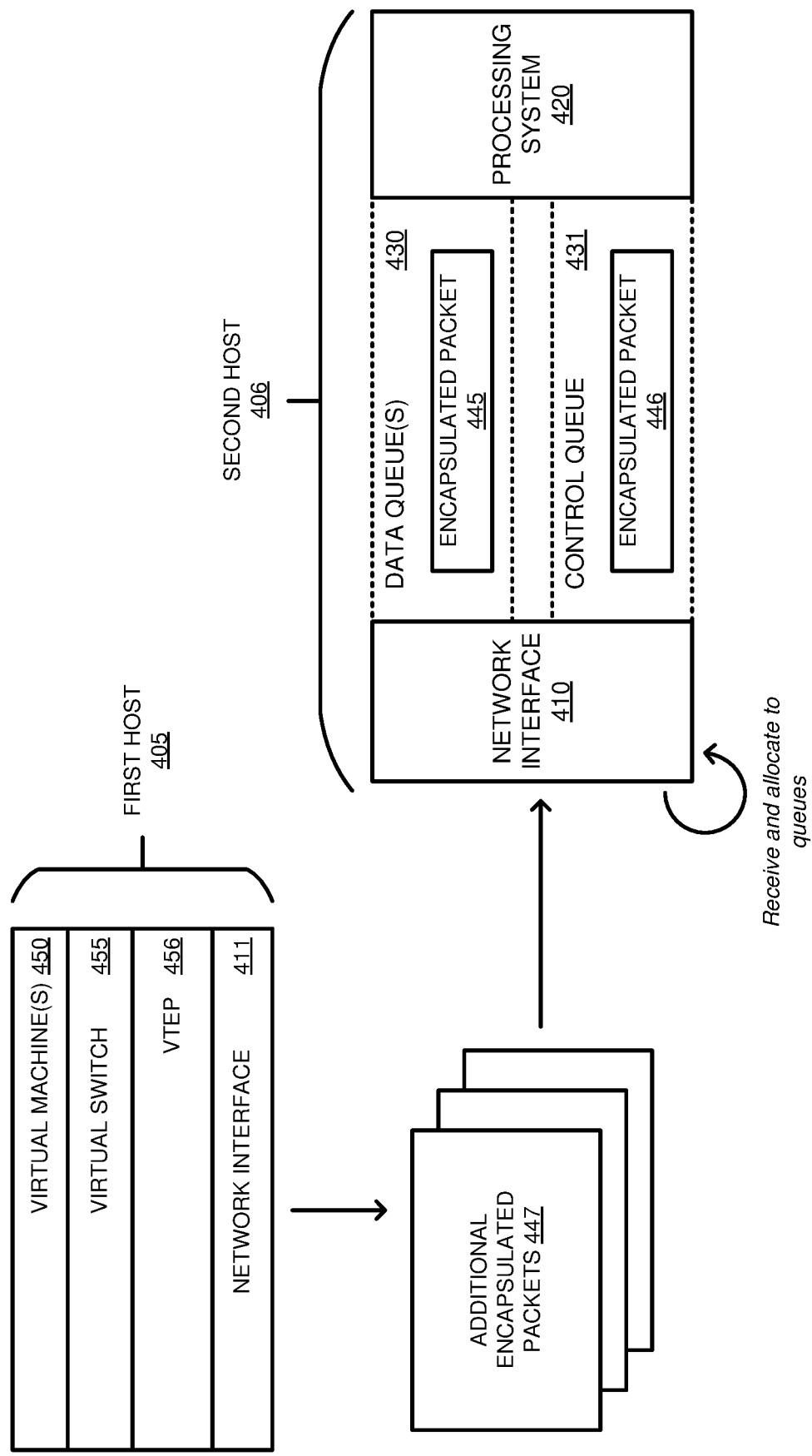

FIGS. 4A and 4B illustrate an overview of managing encapsulated packets according to an implementation. FIGS. 4A and 4B include first host 405 with network interface 411, virtual machine 455, virtual switch 455, and VTEP 456. FIGS. 4A and 4B further include second host 406 with network interface 410, processing system 420, and queues 430-431.

Referring first to FIG. 4A, in operation, VTEP 456 may encapsulate packets that are communicated over or by virtual switch 455, wherein virtual switch 455 provides networking connectivity to virtual machine 450. These packets may include data packets, as well as control packets that are used fault detection between nodes. For example, BFD control packets may be used by virtual switch 455 to monitor whether there is a fault at a second virtual switch or a second gateway within a network. In the present implementation, VTEP 456 generates encapsulated packets 445-446, wherein encapsulated packet 445 includes a data packet 440 and encapsulated packet 446 includes a control packet 441 destined for second host 406. These packets may be encapsulated using VXLAN, GENEVE, or some other similar tunneling protocol.

Turning to FIG. 4B, as the encapsulated packets are received at network interface 410, the packets are then filtered into corresponding queues of queues 430-431. To provide the filtering operation, in some implementations, network interface 410 may monitor for flags within the encapsulation header to identify which of the encapsulated packets contain control packets. For example, when the encapsulated packet is generated at first host 405, the data packet of packets 440-441 may be inspected to determine whether the packet comprises a control packet. This determination may be based on information in the header of packets 440-441, such as source or destination of the packet, a packet type identifier, or some other similar information. Based on the information, the encapsulation header may be updated to identify the type of packet. For example, a bit in the encapsulation header may be set to "1" when the packet is a control packet, or may be set to "0" when the packet is not a control packet.

In other implementations, rather than inspecting the encapsulation header, network interface 410 may inspect the inner header of the encapsulated packets, in this example, the headers of packets 440-441. In inspecting the inner header, network interface 410 may identify source and destination IP addresses for the communication, may identify source and destination port addressing, or other similar attributes for the inner headers corresponding to packets 440-441. Based on the inspection, network interface 410 may place the packets in the corresponding queue of queues 430-431, wherein each of the queues may be allocated different processing resources. In particular, because packet 441 comprises a control packet, encapsulated packet 446 is placed within control queue 431, while encapsulated packet 445 is placed in data queue 430. As the packets are being filtered additional encapsulated packets 447 may be received by network interface 410 and placed in a corresponding queue for processing.

Although not illustrated in the present implementation, to configure network interface 410, a controller may be provided that is executed by processing system 420 capable of configuring the filters of network interface 410 as described herein. In particular, the controller may be responsible for identifying at least one control processing queue from the available processing queues when the host is initiated, and may further be configured to dynamically change the queue that is allocated to the control packets when expiration events occur for the identified processing queue. For example, although control queue 431 is initially identified by processing system 420 to process control packets for at least one software defined network, the controller may identify monitor for the expiration of control queue 431, and identify at least one secondary queue that can be used to replace the first control queue in processing the control packets. In some implementations, the selection of the queues may be random based on pseudorandom value generators or some other similar algorithm to randomly select at least one queue for processing the control packets. In other implementations, rather than randomly selecting the queue for the control packets, the queue may be selected based on the quantity of packets processed by each of the queues, the current length of each of the queues, or some other similar factor. Thus, as an example, if a data queue in data queue(s) 430 were the shortest queue While demonstrated in the previous examples as prioritizing BFD, BGP, and other fault detection packets, it should be understood that similar operations may be used on other encapsulated control packets. For example, packets used to configure a virtual switch may be encapsulated, and the network interface may be used to identify the encapsulated control packets for the virtual switch configuration.

Figure 5:
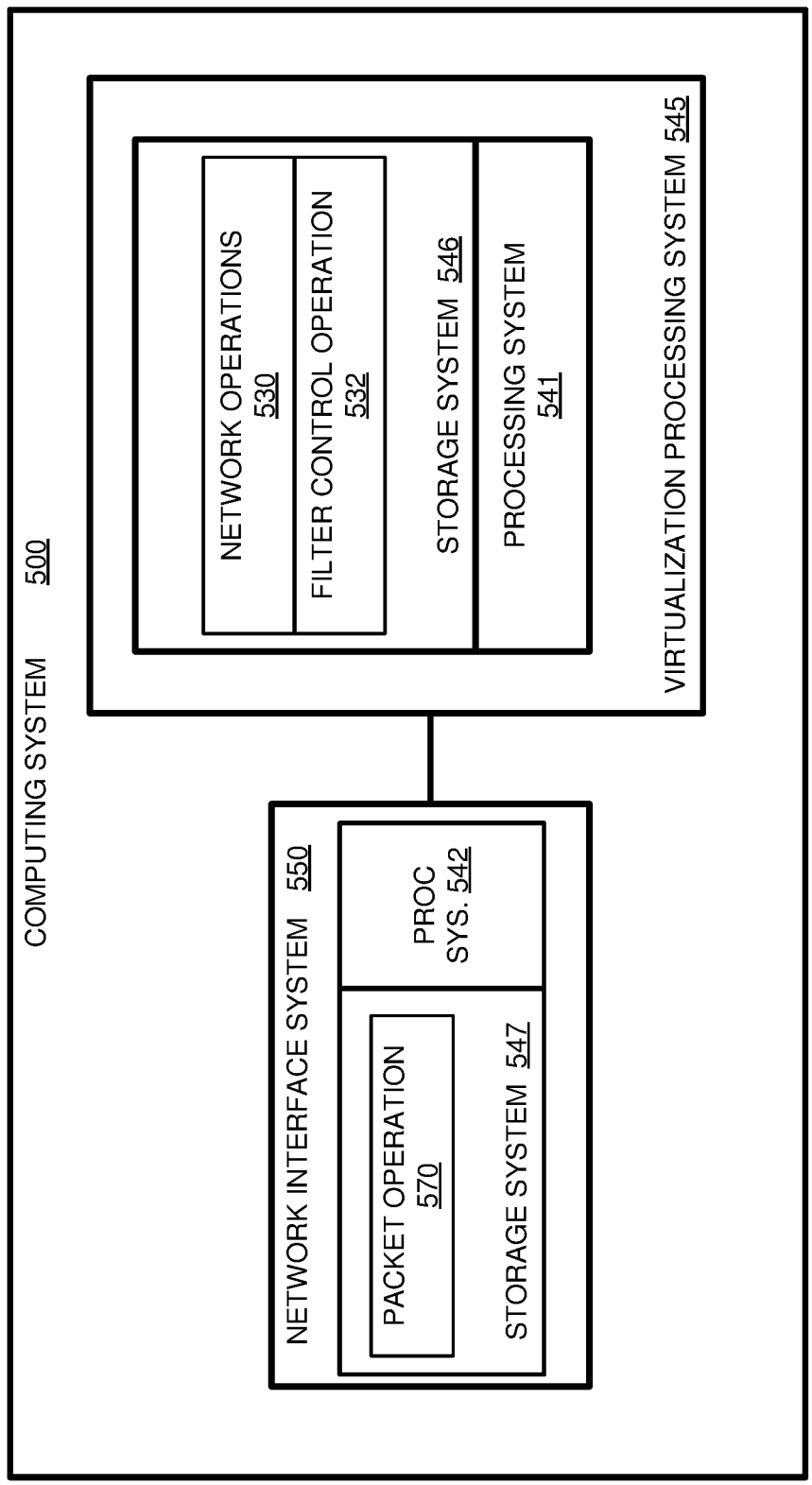
FIG. 5 illustrates a computing system capable of packet filtering according to an implementation.

FIG. 5 illustrates a computing system 500 to prioritize processing of network packets according to an implementation. Computing system 500 is an example of a host computing system described previously in FIGS. 1-4. Computing system 500 includes network interface system 550 which is communicatively coupled to main processing system 545. Network interface system 550 includes storage system 547 and processing system 542, which is used to perform packet operation 570. Main processing system 545 includes storage system 546 and processing system 541, which is used execute network operation 530 and filter control operation 532.

In operation, network interface system 550 comprises components that communicate over communication links, such as network cards, ports, radio frequency (RF), processing circuitry and software, or some other communication devices. Network interface system 550 may be configured to communicate over metallic, wireless, or optical links. Network interface system 550 may be configured to use Time Division Multiplex (TDM), Internet Protocol (IP), Ethernet, optical networking, wireless protocols, communication signaling, or some other communication format—including combinations thereof. In some implementations, network interface system 550 may be configured to communicate with one or more other physical computing systems using both data and control packets. These systems may include other virtualization host computing systems, edge host computing systems, internet computing systems, and the like.

Processing systems 541-542 comprise microprocessor and other circuitry that retrieves and executes operating software from storage systems 546-547, respectively. Storage systems 546-547 may each include volatile and nonvolatile, removable and non-removable media implemented in any method or technology for storage of information, such as computer readable instructions, data structures, program modules, or other data. Storage systems 546-547 may each be implemented as a single storage device, but may also be implemented across multiple storage devices or sub-systems. Storage systems 546-547 may each comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal. While demonstrated in the example of FIG. 5 with multiple storage systems 546-547, it should be understood that the storage systems may be shared in some implementations.

Processing systems 541-542 are typically mounted on a circuit board that may also hold the storage systems. The operating software of storage systems 546-547 comprise computer programs, firmware, or some other form of machine-readable program instructions. The operating software of storage system 547 comprises packet operation 570, while the operating software for storage system 546 includes network operations 530 and filter control operation 532. The operating software on each storage system of storage systems 546-547 may further include an operating system, utilities, drivers, network interfaces, applications, or some other type of software. When read and executed by processing systems 541-542 the operating software on storage systems 546-547 direct computing system 500 to operate as described herein.

In particular, processing system 541 may read and execute network operations 530 to provide software defined networking operations for computing system 500, wherein the networking operations may include switching, routing, encapsulation, distributed firewalls, and other similar operations for a software defined network. In addition to network operations, processing system 541 further reads and executes filter control operation 532, which may be used to identify and configure network interface system 550 to operate as described herein. In particular, upon initialization of computing system 500, which may comprise a power on operation for computing system 500 or the initiation of network operations 530, filter control operation 532 may be used to select at least one processing queue in a plurality of processing queues for control packets of at least one software defined network. In selecting the at least one processing queue, filter control operation 532 may include algorithms and/or pseudorandom value generators to select required queues. Once selected, filter control operation 532 may direct processing system 541 to filter control packets to the selected at least one processing queue.

Once configured, processing system 542 executes packet operation 570 to provide the desired filtering operation. In particular, as packets are received by network interface system 550, packet operation 570 directs processing system 542 to determine whether the packets comprise control packets for a software defined network, and if the packets comprise control packets, allocate or place the packets in the selected processing queue for processing by virtualization processing system 545. In determining whether the packets comprise control packets, packet operation 570 may perform packet inspection and filtering operations to identify traits within the packet, such as header flags, addressing traits, or some other similar information to determine whether the packet comprises a control packet.

In some implementations, filter control operation 532 may direct processing system 541 to identify an expiration event for the control packet processing queue. In response to identifying the expiration event, filter control operation 532 may select one or more secondary processing queues for the control packets and configure network interface system 550 to modify the filter configuration to forward control packets to the one or more secondary processing queues.

While demonstrated in the example of computing system 500 as implementing packet operation 570 using a storage system and processing system, it should be understood that the packet filtering operations may be implemented, at least in part, using processing circuitry that may include one or more field programmable gate arrays (FPGAs), one or more application-specific integrated circuits (ASICs), or some other similar logical circuits to implement the required operations. This processing circuitry may be used in addition to or in place of the processing system and storage system described above.

Although not illustrated in the example of FIG. 5, it should be understood that virtualization processing system 545 may further include one or more virtual nodes (e.g. virtual machines or containers) to provide various operations on the computing system. These virtual nodes may operate on top of a hypervisor or host operating system that abstracts the physical components of the computing system, such as processing systems, storage systems, network interfaces, and the like and provides them to the individual virtual node. In some implementations, virtualization processing system 545 may be configured as an edge host that provides network connectivity as a distributed router or centralized gateway for services of a software defined network (such as firewall services, VPN services, load balancing services, and the like), wherein the edge host may be connected to the internet, other edge hosts, as well as hosts for virtual machines and containers. In particular, rather than a hypervisor and virtual machines, the edge host may comprise at least one virtual switch and a VTEP to communicate with the other computing systems to provide data and control communications. In some implementations, the edge gateway functions may be implemented as a virtual machine or container on a host computing system and provide the various functions described above, such as load balancing and failover operations, wherein the virtualized gateway function may communicate with gateway functions on other host computing system Although illustrated in the examples of FIGS. 1-5 as placing packets in processing queues for an SDN environment, it should be understood that similar operations may be used in packets for a network function virtualization (NFV) environment. In particular, similar to the physical limitations presented by the network interface of a host in a SDN environment, a computing system that provides NFV functionality may be required to exchange control packets with one or more other computing systems. Consequently, as packets are received, the computing system may prioritize the control packets over other data packets, and provide processing resources based on the prioritization. This providing of processing resources may include processing the control packets prior to other data packets, allocating one or more cores of the processing system to the control packets, allocating time slices of the processing system to the control packets, allocating buffer memory to the control packets, or any other similar means of processing the data packets based on the prioritization. Consequently, control packets which are exchanged between virtual nodes (containers and virtual machines) of the NFV may be provided with a higher quality of service than the data packets that are communicated between the nodes of the NFV.

While demonstrated in the examples of FIGS. 1-5 as identifying processing queues for control packets, it should be understood that similar operations may be performed for any packet with a minimum quality of service requirement. In particular, in addition to or in place of identifying control packets based on whether the packet corresponds to a control protocol, the network interface may be configured to identify any attributes for packets with a minimum quality of service. For example, the hypervisor may configure the network interface to identify and place into a defined processing queue any packets from a particular source IP address. In configuring the network interface, the hypervisor may select the processing queue from a plurality of processing queues as described herein, and may change the processing queue allocated to the packets over time as further described herein.

Returning to the elements of FIG. 1, computing systems 111 and 115 may each comprise communication interfaces, network interfaces, processing systems, computer systems, microprocessors, storage systems, storage media, or some other processing devices or software systems, and can be distributed among multiple devices. Computing systems 111 and 115 can each include software such as an operating system, logs, databases, utilities, drivers, natural language processing software, networking software, and other software stored on a computer-readable medium. Computing systems 111 and 115 may each comprise a serving computing system, a desktop computing system, or some other similar computing system.

Communication between hosts computing systems 111 and 115 may use metal, glass, optical, air, space, or some other material as the transport media. Communication between computing systems 111 and 115 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between computing systems 111 and 115 may be a direct link or can include intermediate networks, systems, or devices, and can include a logical network link transported over multiple physical links.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method of managing network traffic in a computing system, the method comprising:
    in response to an initialization of the computing system, selecting, at random or at pseudorandom, a processing queue for control packets of at least one software defined network from a plurality of processing queues available on the computing system;
    configuring a network interface to filter the control packets to the selected processing queue.

2. The method of claim 1, further comprising:
    receiving a plurality of network packets at the network interface;
    for each packet in the plurality of network packets, identifying when the packet comprises a control packet for the at least one software defined network; and
    when the packet comprises a control packet for the at least one software defined network, placing the packet in the selected processing queue.

3. The method of claim 1, wherein the control packets comprise Bidirectional Forwarding Detection packets.

4. The method of claim 1, wherein the control packets comprise a Border Gateway Protocol packets.

5. The method of claim 1 further comprising:
    identifying a timeout event for the selected processing queue;
    in response to the timeout event, selecting a second processing queue to replace the selected processing queue for the control packets from the plurality of processing queues; and
    configuring the network interface to filter the control packets to the second processing queue.

6. The method of claim 1 further comprising:
    identifying when a quantity of packets processed from the selected processing queue satisfy a processed packet threshold;
    in response to the quantity of packets processed from the selected processing queue satisfying the processed packet threshold, selecting a second processing queue to replace the selected processing queue for the control packets from the plurality of processing queues; and
    configuring the network interface to filter the control packets to the second processing queue.

7. The method of claim 1 further comprising:
    identifying when a length of the selected processing queue satisfies a length threshold;
    in response to the length of the selected processing queue satisfying the length threshold, selecting a second processing queue to replace the selected processing queue for the control packets from the plurality of processing queues; and
    configuring the network interface to filter the control packets to the second processing queue.

8. The method of claim 1, wherein the control packets of the at least one software defined network comprises control packets capable of identifying fault detection.

9. A computing system comprising:
    one or more non-transitory computer readable storage media;
    at least one processing system operatively coupled to the one or more non-transitory computer readable storage media; and
    program instructions stored on the one or more non-transitory computer readable storage media to manage network traffic in the computing system that, when read and executed by the at least one processing system, direct the at least one processing system to at least:
        in response to an initialization of the computing system, select, at random or at pseudorandom, one or more processing queues for control packets of at least one software defined network from a plurality of processing queues available on the computing system;
        configure a network interface to filter the control packets to the one or more processing queues.

10. The computing system of claim 9, wherein the program instructions further direct the at least one processing system to:
    receive a plurality of network packets at the network interface;
    for each packet in the plurality of packets, identify when the packet comprises a control packet for the at least one software defined network; and
    when the packet comprises a control packet for the at least one software defined network, place the packet in the one or more processing queues.

11. The computing system of claim 9, wherein the control packets comprise Bidirectional Forwarding Detection packets or Border Gateway Protocol packets.

12. The computing system of claim 9, wherein the program instructions further direct the at least one processing system to:
    identify an expiration event for the one or more processing queues;
    in response to the expiration event, select one or more secondary processing queues to replace the one or more processing queues for the control packets from the plurality of processing queues; and
    configure the network interface to filter the control packets to the one or more secondary processing queues.

13. The computing system of claim 9, wherein the program instructions further direct the at least one processing system to:
    identify a timeout event for the one or more processing queues; and
    in response to the timeout event, select one or more secondary processing queues to replace the one or more processing queues for the control packets from the plurality of processing queues; and
    configure the network interface to filter the control packets to the one or more secondary processing queues.

14. The computing system of claim 9, wherein the program instructions further direct the at least one processing system to:
    identify when a quantity of packets processed from the one or more processing queues satisfy a processed packet threshold; and in response to the quantity of packets processed from the one or more processing queues satisfying the processed packet threshold, select one or more secondary processing queues to replace the one or more processing queues for the control packets from the plurality of processing queues; and configure the network interface to filter the control packets to the one or more secondary processing queues.

15. The computing system of claim 9, wherein the program instructions further direct the at least one processing system to:

identifying when a length of the one or more processing queues satisfies a length threshold; and in response to the length of the one or more processing queues satisfying the length threshold, select one or more secondary processing queues to replace the one or more processing queues for the control packets from the plurality of processing queues; and configure the network interface to filter the control packets to the one or more secondary processing queues.

16. The computing system of claim 9, wherein the control packets of the at least one software defined network comprises control packets capable of identifying fault detection.

17. A computing system comprising:

a network interface system operatively coupled to a processing system; and the processing system configured to:

select one or more first processing queues to filter packets with a quality of service requirement from a plurality of processing queues;

configure the network interface system to filter the packets with the quality of service requirement to the one or more first processing queues;

identify an expiration event for the one or more first processing queues;

in response to the expiration event, select one or more secondary processing queues to replace the one or more first processing queues from the plurality of processing queues; and configure the network interface system to filter the packets with the quality of service requirement to the one or more secondary processing queues.

18. The computing system of claim 17, wherein the expiration event comprises:

a timeout event for the one or more first processing queues;

a quantity of packets processed from the one or more first processing queues satisfying a processed packet threshold; or a length of the one or more first processing queues satisfying a length threshold.

* * * * *